US005497002A

United States Patent [19]
Baliga et al.

[11] Patent Number: 5,497,002
[45] Date of Patent: Mar. 5, 1996

[54] PYROELECTRIC CRYSTAL ELEMENT AND ARRAY MOUNTING METHOD

[75] Inventors: Shankar Baliga, Bethpage; George Rullman, Dix Hills, both of N.Y.

[73] Assignee: Servo Corporation of America, Hicksville, N.Y.

[21] Appl. No.: 327,995

[22] Filed: Oct. 24, 1994

[51] Int. Cl.$^6$ ..................................................... G01J 5/02
[52] U.S. Cl. ........................................ 250/338.3; 250/349
[58] Field of Search .............................. 250/338.2, 338.3, 250/332, 349

[56] References Cited

U.S. PATENT DOCUMENTS

| | | | |
|---|---|---|---|
| 4,214,165 | 7/1980 | Asawa | 250/338.3 |
| 5,079,420 | 1/1992 | Turnbull | 250/338.3 |
| 5,122,666 | 6/1992 | Turnbull | 250/338.3 |

FOREIGN PATENT DOCUMENTS

| | | | |
|---|---|---|---|
| 58-182523 | 10/1983 | Japan | 250/338.3 |
| 61-193030 | 8/1986 | Japan | 250/338.3 |

*Primary Examiner*—Carolyn E. Fields
*Assistant Examiner*—Edward J. Glick
*Attorney, Agent, or Firm*—Kane, Dalsimer, Sullivan, Kurucz, Levy, Eisele and Richard

[57] ABSTRACT

A method and apparatus for mounting pyroelectric crystal elements and arrays on a molded plastic base. The molded plastic base includes a plurality of upwardly tapered plastic flexible legs which engage the pyroelectric crystal element or array at various points. The upwardly tapered plastic legs reduce to a nominal thickness of approximately 0.002 inches where they are fastened by epoxy onto the pyroelectric crystal element or array.

6 Claims, 1 Drawing Sheet

# 5,497,002

PYROELECTRIC CRYSTAL ELEMENT AND ARRAY MOUNTING METHOD

BACKGROUND OF THE INVENTION

1. Field of the Invention

The invention pertains to a mounting for an array of crystal detector elements for pyroelectric detectors, particularly those made from crystalline lithium tantalate.

2. Description of the Prior Art

Crystalline lithium tantalate (LTO) is widely used in pyroelectric detectors and detector arrays. Pyroelectric detectors are thermal detectors which respond to a temperature change by producing an electric charge which is measured as a signal voltage via interfacing electronics. The detector element is typically comprised of a thin (20 to 200 micron thick) slab of crystal material which has been processed to be polarized and then ground, polished and patterned to produce individual pixels or arrays. Typical element sizes used are 0.5 mm square linear arrays of n such pixels (n=4, 8, 16 etc.) which may be separated by 0.1 mm spacing. Other sizes and configurations are clearly possible since the pyroelectric detector is a capacitive structure.

A typical use of such a detector is in satellite guidance such as is disclosed in U.S. Pat. No. 5,055,689 to Proffit and Rose entitled "Horizon Sensor Apparatus and Method Therefor"; U.S. application Ser. No. 08/229,460 filed Apr. 18, 1994 entitled "Earth Sensor for Satellites with Radiance Compensation"; and U.S. application Ser. No. 08/227,270 filed Apr. 13, 1994 entitled "Earth Sensor for Satellites", now U.S. Pat. No. 5,455,424 .

The electro-optical performance of these pyroelectric detectors and detector arrays is largely determined by the crystal size and shape, and the means used to mount the crystal. In order to maximize the voltage output, a large thermal time constant of several hundred milliseconds is required. For this, the crystal needs to be supported as minimally as possible in order to reduce heat drain from the crystal and provide thermal isolation. In prior art structures, the crystal elements have been supported by wire loops or a ceramic or plastic frame attached around the crystal perimeter with epoxy. Problems are associated with these schemes of crystal mounting. Firstly, the pyroelectric crystals are also piezoelectric. The mounting scheme must therefore minimize vibrations transferred to the crystal to obtain low microphonic output. Secondly, the detectors often need to operate over a large range of operating temperatures. The mounting structure must minimize the thermal stresses generated at the crystal by differential expansions of the support and crystal as the thermal stresses can generate voltage spikes (i.e., "glitches") from the device.

OBJECTS AND SUMMARY OF THE INVENTION

It is therefore an object of the present invention to support a pyroelectric crystal element so as to maximize voltage output via a large thermal time constant.

It is therefore a further object of the present invention to support a pyroelectric crystal element as minimally as possible.

It is therefore a still further object of the present invention to support a pyroelectric crystal element solidly with a minimum of vibration transferred to the crystal.

It is therefore a still further object of the present invention to reduce the microphonic output of a pyroelectric crystal element.

It is therefore a still further object of the present invention to mount a pyroelectric crystal so as to minimize the thermal stresses generated at the crystal by differential expansions of the support and crystal.

It is therefore a final object of the present invention to reduce the generation of voltage spikes from a mounted pyroelectric crystal.

These and other objects are achieved by provided a method and apparatus for crystal mounting. The mount is comprised of a molded plastic base which has tapered plastic legs which reduce to a nominal thickness of 0.002 inches at the top. The crystal is joined by epoxy to the top of the tapered legs. The number of legs and the spacing of the legs is determined by the crystal size. For example, a small one millimeter square crystal may be supported by three legs, whereas a larger crystal with a linear array pattern may require ten legs. The small contact area between supports and the crystal and the low thermal conductivity of the plastic support provide the desired minimal support and excellent thermal isolation of the crystal resulting in the desired long time constants. The flexible nature of the plastic legs also results in reduced microphonics, reduced thermal stress and reduced voltage spikes, while not compromising any of the electro-optical performance requirements.

The mounting scheme is not limited to lithium tantalate but can be used with a large variety of pyroelectric and ferroelectric crystals and ceramics such as lithium niobate, lead zirconate titanate and lead titanate which are similarly affected by thermal and mechanical stresses.

BRIEF DESCRIPTION OF THE DRAWINGS

Further objects and advantages of the invention will become apparent from the following description and claims, and from the accompanying drawing, wherein:

DETAILED DESCRIPTION OF THE PREFERRED EMBODIMENT

Figure 1:
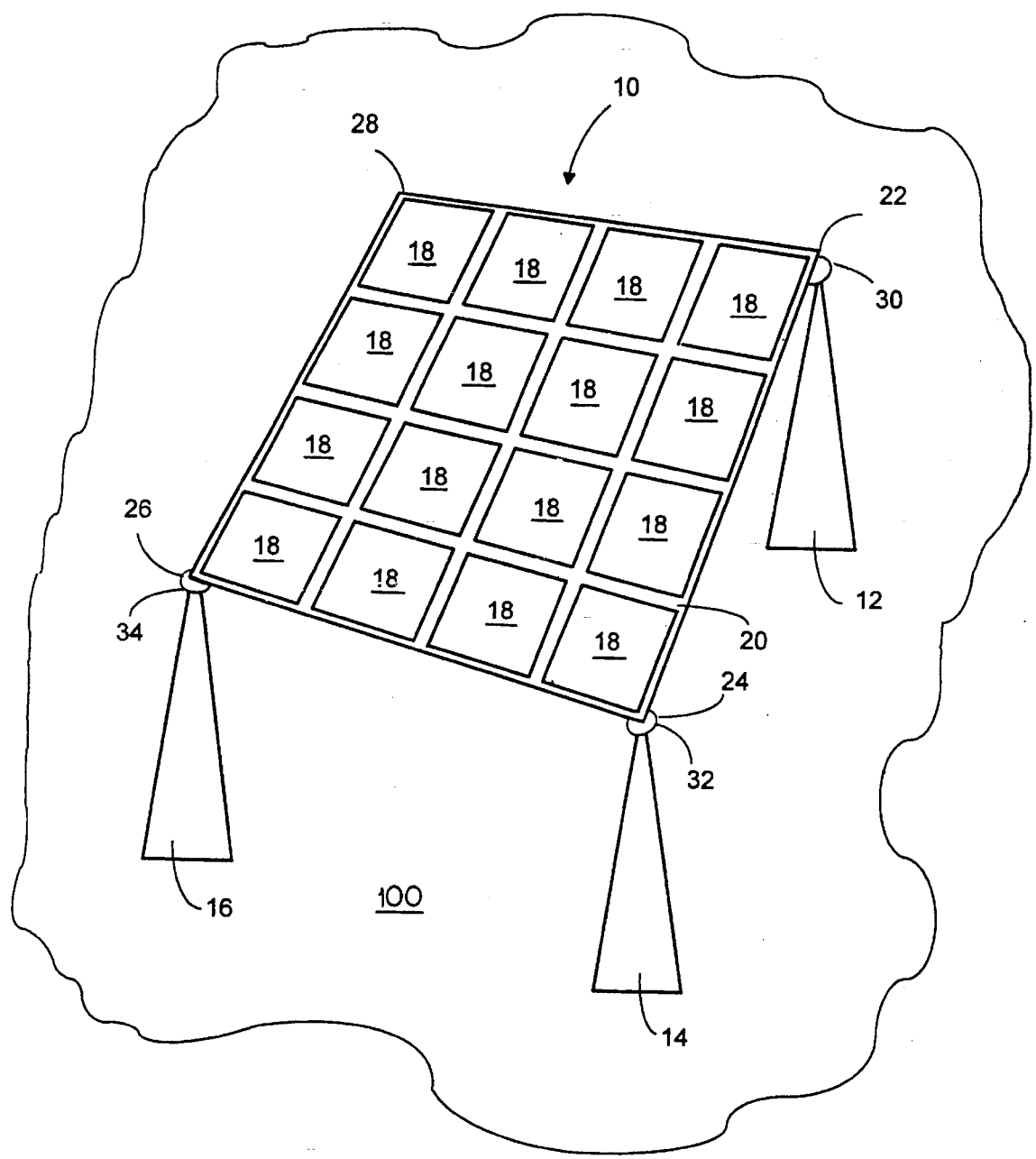
FIG. 1 is a perspective view of the present invention.

Referring now to the drawing in detail, one sees that FIG. 1 is a perspective view of the pyroelectric crystal detector element 10 mounted on legs 12, 14, 16 on planar molded plastic base 100.

Pyroelectric crystal detector element 10 is comprised of an array of four pixels by four pixels 18 which are typically 0.5 millimeters square with a 0.1 millimeter gap 20 between the pixels 18. As stated previously, the number of pixels 18 in the array can vary with the application of the pyroelectric crystal detector element 10. The pyroelectric crystal detector element 10 is a capacitive structure and is typically made of lithium tantalate, but, similarly, a large variety of pyroelectric and ferroelectric crystals and ceramics such as lithium niobate, lead zirconate titanate and lead titanate can be used.

Pyroelectric crystal detector element 10 typically comprises a thin (20 to 200 micron thick) slab of the crystal material which has been specially processed to be polarized and then ground, polished and patterned to produce individual pixels 18 or similar arrays.

Pyroelectric crystal detector element 10 is supported above planar molded plastic base 100 by plastic legs 12, 14 and 16. The plastic legs 12, 14 and 16 are typically integral with molded plastic base 100. The illustrated configuration includes a plastic leg at each corner 22, 24, 26 of the square pyroelectric crystal detector element 10 and therefore would include a fourth leg descending from corner 28 but this leg is hidden by the perspective of FIG. 1. Legs 12, 14 and 16 (and the hidden fourth leg) are secured to the respective corners 22, 24 and 26 by epoxy joints 30, 32 and 34. Legs 12, 14 and 16 (and the hidden fourth leg) ascend from planar molded plastic base 100 in a tapered configuration which reduces to a nominal thickness of 0,002 inches at the point of contact to pyroelectric crystal detector element 10. The small contact area between the legs 12, 14 and 16 (and the hidden fourth leg) and the pyroelectric crystal detector element 10, and the low thermal conductivity of planar molded plastic base 100, provide the desired minimal mounting configuration and the resultant excellent thermal isolation of the pyroelectric crystal detector element 10 resulting in reduced heat drain and the desired long time constants which increases voltage output. The flexible nature of the legs 12, 14 and 16 (and the hidden fourth leg) also results in minimal microphonics and thermal stress, while not compromising any of the electro-optical performance requirements.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. In a sensor of the type comprising a pyroelectric detector, the improvement comprising a plurality of flexible legs extending from a base to the pyroelectric detector, each of said plurality of legs reaching a portion of a preselected reduced diameter, said portions of reduced diameter being fixed to said pyroelectric detector and said flexible legs providing a shock mounting for said pyroelectric detector to said base.

2. The improvement of claim 1 wherein said legs are comprised of plastic.

3. The improvement of claim 2 wherein said legs are tapered.

4. The improvement of claim 3 wherein said legs are joined to the pyroelectric detector by epoxy.

5. The improvement of claim 4 wherein said base and said legs are comprised of an integral piece of molded plastic.

6. The improvement of claim 5 wherein said preselected reduced diameter is 0.002 inches.

\* \* \* \* \*